United States Patent Office 3,308,712
Patented Mar. 14, 1967

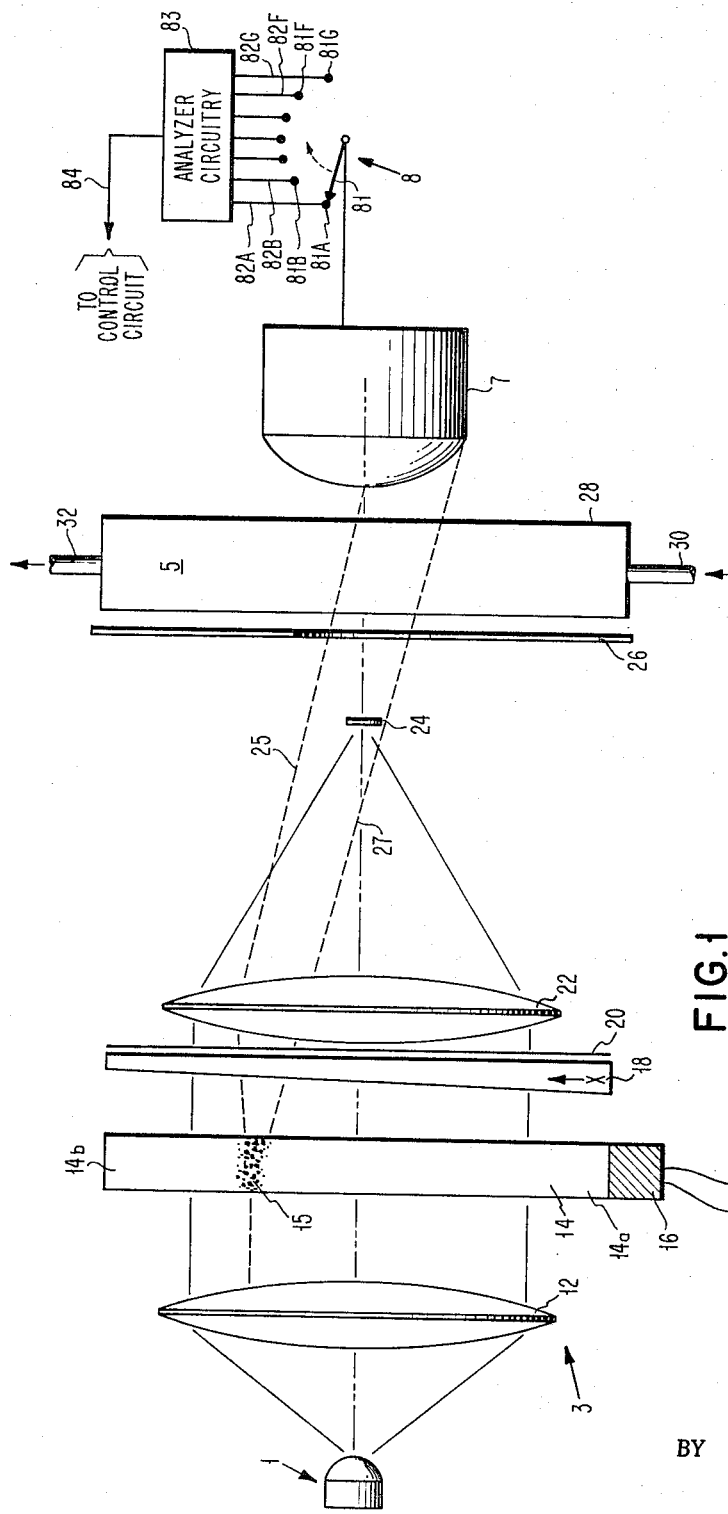

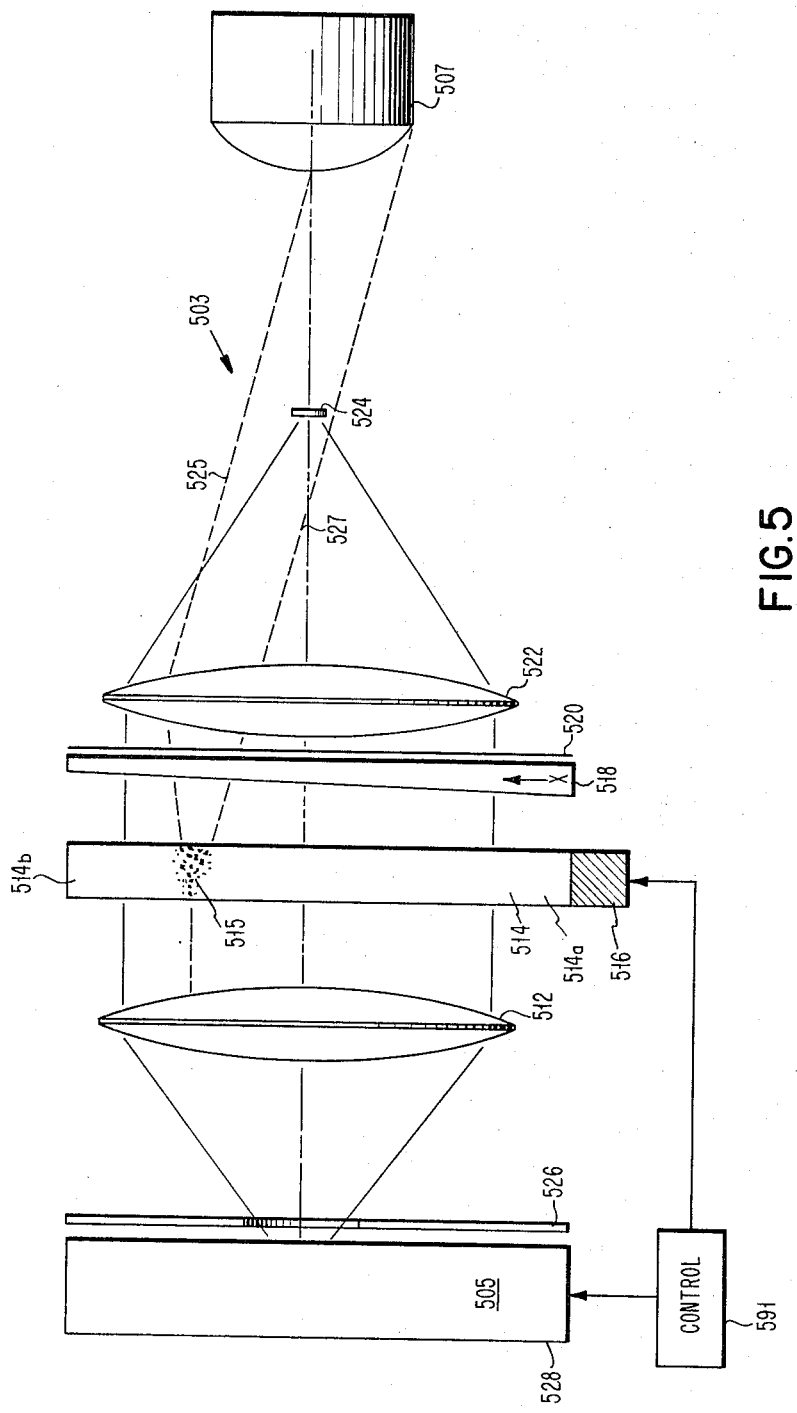

3,308,712
TRANSDUCER FOR SPECTRUM ANALYSIS
APPLICABLE TO CLOSED LOOP CONTROL
Ronald H. Kay, Los Gatos, Calif., assignor to International Business Machines Corporation, New York, N.Y., a corporation of New York
Filed Nov. 6, 1963, Ser. No. 321,916
8 Claims. (Cl. 88—14)

This invention relates to transducers and more particularly to transducers responsive to absorption or emission spectra.

The art of spectrum analysis is well developed and many highly sophisticated devices are known for detecting absorption and emission spectra. However, the known devices are not particularly well suited where a rapid scan of the spectrum is desired nor are present devices well suited as transducers in automatic process control systems. The present invention is directed to a spectrometer which is particularly suited for application as a transducer in an automatic process control system.

An object of the present invention is to provide an improved transducer which is responsive to absorption or emission spectra.

A further object of the present invention is to provide an improved spectrometer.

A still further object of the present invention is to provide a simple and rugged spectrometer.

Yet another object of the present invention is to provide a device for continually sensing the absorption spectrum of a sample.

Yet another object of the present invention is to provide a spectrometer which is particularly suited for use as a transducer in a process control system.

A still further object of the present invention is to provide a device which can rapidly scan the absorption spectrum of a sample.

Yet another object is to provide a device which can rapidly scan the emission spectrum of a sample.

The transducer of the present invention includes a polychromatic light source, a dynamic filter, and a detector. The dynamic filter only allows light of one frequency to pass, the particular frequency which is allowed to pass varies as a function of time. When used as an absorption spectrometer the light which passes through the dynamic filter is directed through a sample and then to a detector. The detector produces a signal which represent the absorption spectrum of the sample. When used to detect the emission spectra of the sample, the light source is replaced by the luminous sample and the light from the sample is directed through the dynamic filter to the detector.

The foregoing and other objects, features and advantages of the invention will be apparent from the following more particular description of a preferred embodiment of the invention, as illustrated in the accompanying drawings.

FIGURE 1 shows a preferred embodiment of the invention.

FIGURE 2 shows the light which passes through the dynamic filter.

FIGURE 3 shows the operation of the wedge interference filter.

FIGURE 4 shows the function of the compensating mask.

FIGURE 5 shows an alternate embodiment.

The embodiment shown in FIGURE 1 detects the absorption spectrum of a sample. It includes a polychromatic light source 1, a dynamic filter 3, a sample which is to be analyzed 5, a light detector 7, and an output circuit 8. The filtering action of dynamic filter 3 is a function of time, as shown in FIGURE 2. In the normal state, no light passes through the filter as shown between the times designated "0" and "a" in FIGURE 2. After a start signal is applied to the filter (in a manner which will be explained in detail later) light of a particular frequency passes through the filter and as time progresses the frequency of the light which passes through the filter changes, as shown in FIGURE 2. After a time designated "b" in FIGURE 2, no light passes through the filter.

Thus, light of varying frequency is directed at the sample 5. Depending upon the characteristics of sample 5, certain frequencies of the light are absorbed and certain frequencies are not absorbed. Detector 7 naturally only observes light of those frequencies which are not absorbed, therefore giving an indication of the absorption spectrum of sample 5.

Dynamic filter 3 includes collimating lens 12, sonic delay line 14, wedge interference filter 18, compensating mask 20, condensing lens 22, and mask 24. Sonic delay line 14 includes a piezoelectric driver 16 which can be activated from terminal 17. When piezoelectric driver 16 is activated a pulse propagates from the end of delay line 14 which is designated 14a, to the end of delay line 14 which is designated 14b. A pulse designated 15 is diagrammatically illustrated in FIGURE 1. Light normally passes directly through delay line 14; however, at points where a pulse is located (for example, pulse 15) the light is refracted. This is a well known phenomena. For example, see Ultrasonics by Bensen Carlin, McGraw-Hill Book Company (1949), or U.S. Patent 2,418,964 by D. L. Arenberg.

Wedge interference filter 18 is a conventional device well known in the art. For example, see University Physics Series, "Introduction to Optics Geometrical and Physical," by John Robertson, Van Nostrand Company (1957). At each point along the length of interference filter 18, light of only one particular frequency passes through the filter. The frequency of the light which passes through the filter is a function of distance along the filter, as shown in FIGURE 3 where the frequency of the light which passes through the filter is plotted with respect to the distance along the filter.

Mask 24 is a small opaque object positioned on the optical axis. All of the unrefracted light is focused onto the face of mask 24 by lens 22. As indicated by lines 25 and 27 in FIGURE 1, light which is refracted by a pulse in delay line 14 is not focused onto mask 24. Naturally, mask 24 blocks refracted light in the zero order of the refraction pattern as it does unrefracted light. In the drawing for clarity of illustration, mask 24 is shown unsupported. In an actual device mask 24 may, for example, be supported by very thin wires.

The function of compensating mask 20 is to compensate for the fact that the transparency of the filter 18 is not uniform along the length $x$. Furthermore, there may be other non-linearities present in the optical system. For example, without mask 20 the intensity of the light arriving at the sample may be a function of frequency as indicated by the line A in FIGURE 4. The function of mask 20 is to linearize the response of the system so that the intensity of the light directed at the sample is constant with respect to frequency, that is, so that the intensity of the light arriving at the sample with respect to frequency is as indicated by the line B in FIGURE 4. This is accomplished by varying the transmissivity of mask 20 with respect to distance $x$. The transmissivity of mask 20 with respect to distance is the inverse if curve A is FIGURE 4. The variations in the transmissivity of mask 20 can be designed to compensate for non-linearities in the spectral distribution of the source, the transmission of the filter and the spectral sensitivity of the detector.

Mask 26 is inserted in front of sample 5 so that the area of sample 5 which is analyzed is restricted. The sample 5 is shown in a container 28 which has an entrance hole 30 and an exit hole 32. In this manner the system shown can be used to generate a signal which constantly detects the absorption spectrum of the fluid passing through the system.

Output circuit 8 includes a distributor 81 which has seven points 81A to 81G. Distributor 81 rotates and sequentially contacts each of the points 81A to 81G. The rotation of distributor 81 is initiated when a pulse is applied to a delay line 14 and the timing of the rotation is such that the arm 81 arrives at contact 81G slightly before the time that the pulse arrives at the end of the delay line 14. Thus, signals are generated on lines 82A to 82G which indicate the amount of energy absorbed at particular frequencies. These signals are analyzed by analyzer circuitry 83 which generates a signal on line 84 in response to the signals on lines 82A to 82G. This signal on line 84 can be used as a control signal in a process control system. Analyzer circuitry 83 may merely include simple circuitry such as a threshold circuit attached to each input line whereby a signal will appear on line 84 at a particular time only if the output of detector 7 is above a set value when light of a particular frequency is directed at the sample. On the other hand, analyzer circuitry 83 can include complex devices such as an analog or digital computer which is programmed to detect certain sets of conditions.

An alternate embodiment includes a mask with horizontal slots positioned in front of filter 18. In this alternate embodiment the output of dynamic filter 3 is a series of bursts of light, each burst having a different frequency. There is one burst of light for each horizontal slot in the mask referred to above. The output of detector 7 is therefore a series of pulses. The magnitude of each pulse indicates the absorption spectra of the sample at a partcular frequency.

In another alternate embodiment shown in FIGURE 5 the present invention is used to detect the emission spectrum of a sample. In order to facilitate the explanation of this alternate embodiment and in order to show the correspondence between this embodiment and the first embodiment the last two digits of the numerals used to designate the various components shown in FIGURE 5 are the same numerals as those used to designate corresponding components in FIGURE 1.

The alternate embodiment shown in FIGURE 5 includes a self-luminous sample 505, a dynamic filter 503, and a detector 507. The light from sample 505 passes through dynamic filter 503 to detector 507. Dynamic filter 503 is identical to filter 3 shown in the first embodiment and, hence, no further explanation of dynamic filter 503 is given.

Sample 505 is held by a container 528. The reaction in sample 505 which emits light is initiated by control circuit 591. Control circuit 591 also activates pulse driver 516. In this manner activation of pulse driver 516 can be synchronized with the initiation of the luminous event. Naturally, other types of synchronization can be used. Mask 526 insures that the light from only a restricted portion of sample 505 reaches dynamic filter 503.

While the invention has been particularly shown and described with reference to a preferred embodiment thereof, it will be understood by those skilled in the art that various changes in the form and details may be made therein without departing from the spirit and scope of the invention.

What is claimed is:

1. A spectrum analyzer for detecting the absorption spectrum of a sample comprising:
   an acoustical delay line,
   means for directing collimiated light through said acoustical delay line,
   a wedge interference filter positioned to intercept the light passing through said delay line,
   means for directing the light which passes through said delay line and through said wedge interference filter through said sample, including a mask positioned to block light which passes directly through said delay line, whereby only light which is diffracted by a pulse in said delay line reaches said sample, and
   means for detecting the light passing through said sample.

2. A transducer responsive to the absorption spectrum of a sample comprising:
   an acoustical delay line,
   means for introducing a pulse into said delay line,
   means for directing collimated light at said acoustical delay line,
   a wedge interference filter positioned to intercept the light passing through said delay line,
   means for directing the light which passes through said delay line and through said wedge interference filter through said sample, said last mentioned means including a mask positioned to block light which passes directly through said delay line, whereby only light which is diffracted by said pulse reaches said sample, and
   means for detecting the light passing through said sample.

3. A transducer responsive to the absorption spectrum of a sample comprising:
   an acoustical delay line,
   means for introducing a pulse into said delay line,
   means for directing collimated light through said acoustical delay line,
   a wedge interference filter positioned to intercept the light passing through said delay line,
   a compensation mask having a spatial transmissivity the variations of which are complementary to the variations in the spatial transmissivity of said wedge filter whereby the composite transmissivity of said wedge interference filter and of said mask are constant relative to space,
   means for directing light which passes through said delay line and through said wedge interference filter through said sample, said last mentioned means including a mask positioned to block light which passes directly through said delay line, whereby only light which is diffracted by said pulse reaches said delay line, and
   means for detecting the light passing through said sample.

4. A transducer responsive to the absorption spectrum of a sample comprising:
   an acoustical delay line,
   means for introducing a pulse into said delay line,
   means for directing collimated light at said acoustical delay line,
   a wedge interference filter positioned to intercept the light passing through said delay line,
   means for directing light which passes through said delay line and through said wedge interference filter through said sample, said last mentioned means including a mask positioned to block light which passes directly through said delay line, whereby only light diffracted by said pulse reaches said sample,
   means for detecting the light passing through said sample, and
   means responsive to said detector for analyzing the output thereof and for generating a signal in response thereto.

5. A transduced responsive to the absorption spectrum of a sample comprising:
   an acoustical delay line,
   means for introducing a pulse into said delay line,
   means for directing collimated light at said acoustical delay line,
   a wedge interference filter positioned to intercept the light passing through said delay line, a compensation mask having a spatial transmissivity the variations of which are complementary to the variations in the spatial transmissivity of said wedge filter whereby the composite transmissivity of said wedge interference filter and of said mask are constant relative to space, means for directing light which passes through said delay line and through said wedge interference filter through said sample, said last mentioned means including a mask positioned to block light which passes directly through said delay line, whereby only light which is diffracted by a pulse in said delay line reaches said sample, means for detecting the light passing through said sample, and means responsive to said detector for analyzing the output thereof and for generating a signal in response thereto.

6. A transducer responsive to the absorption spectrum of a sample comprising:

an acoustical delay line, means for introducing a pulse into said delay line, means for directing collimated light at said acoustical delay line, a wedge interference filter positioned to intercept the light passing through said delay line, means for directing light which passes through said delay line and through said wedge interference filter through said sample, and means for detecting the light passing through said sample.

7. A spectrum analyzer for detecting the emission spectrum of a luminous sample comprising:

an acoustical delay line, means for directing light from said sample through said acoustical delay line, a wedge interference filter positioned to intercept the light passing through said delay line, a light detector, and means for directing light which passes through said delay line and through said wedge interference filter to said detector, including a mask positioned to block light which passes directly through said delay line, whereby only light which is diffracted by a pulse in said delay line reaches said detector.

8. A transducer responsive to the emission spectrum of a luminous sampling comprising:

an acoustical delay line, means for introducing a pulse into said delay line, means for directing light from said sample through said acoustical delay line, a wedge interference filter positioned to intercept the light passing through said delay line, a light detector, and means for directing light which passes through said delay line and through said wedge interference filter to said detector, said last mentioned means including a mask positioned to block light which passes directly through said delay line, whereby only light which is diffracted by said pulse reaches said detector.

References Cited by the Examiner

UNITED STATES PATENTS

| | | | |
|---|---|---|---|
| 2,418,964 | 4/1947 | Arenberg | 88—65 |
| 2,971,430 | 2/1961 | Rohner et al. | 88—14 |
| 3,012,467 | 12/1961 | Rosenthal | 88—14 |

JEWELL H. PEDERSEN, *Primary Examiner.*

B. LACOMIS, *Assistant Examiner.*